C. M. FEHL.
TOOL HOLDER.
APPLICATION FILED AUG. 2, 1919.

1,331,490.

Patented Feb. 24, 1920.

INVENTOR.
BY C. M. Fehl.
Victor J. Evans
ATTORNEY.

UNITED STATES PATENT OFFICE.

CLARENCE M. FEHL, OF HARRISBURG, PENNSYLVANIA.

TOOL-HOLDER.

1,331,490.      Specification of Letters Patent.      Patented Feb. 24, 1920.

Application filed August 2, 1919. Serial No. 314,810.

*To all whom it may concern:*

Be it known that I, CLARENCE M. FEHL, a citizen of the United States, residing at Harrisburg, in the county of Dauphin and State of Pennsylvania, have invented new and useful Improvements in Tool-Holders, of which the following is a specification.

This invention relates to a tool holder and has for its primary object to provide a tool holder adapted to grip a short length of tool as effectively as a long length of tool.

Another object of the invention is to provide mechanical means for gripping the tool without the necessity of hammering the parts.

Another object is to provide simple means for exerting great pressure between the tool and tool holder so that the former will be positively prevented from working loose in the latter.

With these and other objects in view the invention will be understood from the following detailed description taken in connection with the accompanying drawing, wherein.

Figure 1:
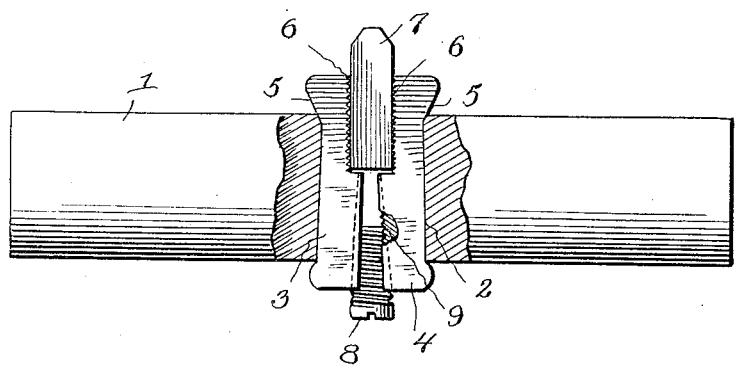
Figure 1 is a longitudinal sectional view through the holder.
Figure 2:
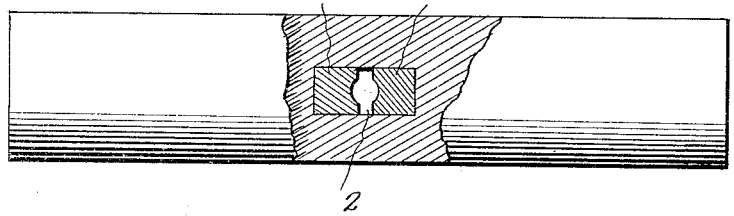
Fig. 2 is a detail longitudinal section in a plane at right angles to Fig. 1.
Figure 3:
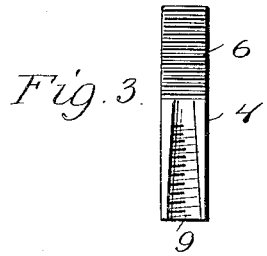
Fig. 3 is an elevation of one of the jaws.

Again referring to the drawings illustrating one of the forms in which my invention may be constructed, the numeral 1 designates a stock preferably a bar in which is formed an opening 2. Arranged in the opening 2 is a pair of jaws 3, 4, each provided with a cam surface 5 for wedge action with a portion of the wall of the opening. Each jaw is further provided with teeth 6 to bite into the tool 7 when a screw 8 is tightened between the jaws. It will be noted that the screw 8 is of tapering outline and the threads 9 on each jaw correspondingly shaped so that upon small adjustment of the screw the jaws will be forcibly moved into engagement with the tool. A very important feature of this construction is that relatively small lengths of tool steel may be used thereby accomplishing a material saving in the cost of tool steel as it is quite often necessary to throw away a short length of tool steel because of the fact that the same will not properly engage the tool holder. It is of course to be understood that the invention may be constructed in various other manners and the parts associated in other relations and therefore I do not desire to be limited in any manner except as set forth in the claims hereunto appended.

What I claim is:—

1. The combination of a stock having an opening therethrough, jaws arranged lengthwise in said opening, and adapted to receive and hold a tool between adjacent end portions thereof, and wedging means interposed between the opposite end portions of the jaws.

2. The combination of a stock having an opening therethrough, jaws arranged lengthwise in said opening and having the inner sides of adjacent end portions recessed and toothed to receive and hold a tool between them and also having tapered threaded recesses in the inner sides of their opposite end portions, and a tapered screw interposed between the latter end portions of the jaws.

3. The combination of a stock having an opening therethrough, jaws arranged lengthwise in said opening and having the inner sides of adjacent end portions recessed and toothed to receive and hold a tool between them and also having tapered threaded recesses in the inner sides of their opposite end portions, and enlargements at their ends, and a tapered screw disposed in the tapered recesses of the jaws and engaging the threads thereof.

4. A tool holder comprising a bar having an opening, a pair of jaws mounted in the opening and having a wedging action with a portion of the walls of said opening and a screw having a tapering screw thread engagement with the jaws for forcing the same into gripping relation with the tool.

In testimony whereof I affix my signature.

CLARENCE M. FEHL.